(12) United States Patent
Yocum (10) Patent No.: US 10,722,068 B2
(45) Date of Patent: Jul. 28, 2020

(54) APPARATUS, SYSTEM, AND METHOD FOR COOKING A MEAL

(71) Applicant: Ken Yocum, Murray, UT (US)

(72) Inventor: Ken Yocum, Murray, UT (US)

(*) Notice: Subject to any disclaimer, the term of this patent is extended or adjusted under 35 U.S.C. 154(b) by 506 days.

(21) Appl. No.: 14/951,388

(22) Filed: Nov. 24, 2015

(65) Prior Publication Data
US 2016/0143476 A1 May 26, 2016

Related U.S. Application Data

(60) Provisional application No. 62/083,848, filed on Nov. 24, 2014.

(51) Int. Cl.
*A47J 33/00* (2006.01)
*F24C 1/16* (2006.01)

(52) U.S. Cl.
CPC ............... *A47J 33/00* (2013.01); *F24C 1/16* (2013.01)

(58) Field of Classification Search
CPC .................................... A47J 33/00; F24C 1/16
See application file for complete search history.

(56) References Cited

U.S. PATENT DOCUMENTS

| | | | |
|---|---|---|---|
| 3,162,113 A | 12/1964 | Tallaksen | |
| 3,511,222 A * | 5/1970 | Miller | A47J 37/0763 126/25 A |
| 3,526,217 A * | 9/1970 | Garske | A47J 37/0763 126/25 A |

(Continued)

FOREIGN PATENT DOCUMENTS

| | | | |
|---|---|---|---|
| AT | 384717 B | * 12/1987 | ............ A45B 23/00 |
| CN | 201790598 U | 4/2011 | |
| DE | 4316232 C2 | 4/1995 | |

OTHER PUBLICATIONS

CampMaid; "CampMaid Lid Holder and Charcoal Holder with Adjustable Grill"; Nov. 20, 2013; https://www.youtube.com/watch?time_continue=1&v=T6gOYnqloR0 (Year: 2013).*

(Continued)

*Primary Examiner* — Jorge A Pereiro
*Assistant Examiner* — Logan P Jones
(74) *Attorney, Agent, or Firm* — Malone IP Law; Steven J. Malone (57) ABSTRACT

An apparatus, system, and method are disclosed for adjustably positioning a fuel source. The apparatus includes a first and second fuel source receiving space and a biasing member. The first fuel source receiving space is defined by a substantially planar first fuel supporting surface and a first wall. The first wall extends substantially perpendicularly from the first fuel supporting surface and circumscribes the first fuel supporting surface. The second fuel source receiving space is hingedly coupled to the first fuel source receiving space. The second fuel source receiving space is defined by a substantially planar second fuel supporting surface and a second wall. The second wall extends substantially perpendicularly from the second fuel supporting surface and circumscribes the second fuel supporting surface. The biasing member is configured to bias at least a portion of the first wall against at least a portion of the second wall.

18 Claims, 9 Drawing Sheets

(56) References Cited

U.S. PATENT DOCUMENTS

| | | | | |
|---|---|---|---|---|
| 3,757,705 A | * | 9/1973 | Maslow | A47B 57/265 108/147.13 |
| 3,832,989 A | | 9/1974 | Belford | |
| 4,437,450 A | | 3/1984 | Connelly | |
| D285,402 S | | 9/1986 | Hamill et al. | |
| 4,632,442 A | * | 12/1986 | Gerding | B65G 7/12 294/119.1 |
| 4,724,753 A | * | 2/1988 | Neyman | A47J 37/0763 126/25 A |
| 4,777,927 A | * | 10/1988 | Stephen | A47J 37/0704 126/25 R |
| 4,829,977 A | * | 5/1989 | Valentine | F24C 1/16 126/25 A |
| D327,602 S | | 7/1992 | Walker | |
| 5,161,561 A | * | 11/1992 | Jamieson | A45B 3/00 108/94 |
| 5,206,996 A | * | 5/1993 | McDaniel | B23D 21/08 30/101 |
| D342,184 S | | 12/1993 | Sanchez | |
| D351,507 S | | 10/1994 | Gregory | |
| D369,939 S | | 5/1996 | Gibbs | |
| D396,379 S | | 7/1998 | Stoetzl | |
| 6,026,999 A | * | 2/2000 | Wakefield | B60R 11/06 220/4.22 |
| 6,363,925 B1 | | 4/2002 | Chavana, Jr. et al. | |
| 6,516,792 B1 | | 2/2003 | McDonald | |
| 6,584,967 B1 | | 7/2003 | Paumen et al. | |
| 6,711,993 B2 | * | 3/2004 | Robertson | A47J 33/00 126/25 A |
| 6,827,076 B2 | * | 12/2004 | Crawford | A47J 37/0731 126/25 R |
| 7,007,687 B2 | | 3/2006 | Lewis | |
| 7,134,762 B2 | * | 11/2006 | Ma | A45B 3/04 362/102 |
| D592,443 S | | 5/2009 | Fraser | |
| 7,802,566 B1 | | 9/2010 | Faught | |
| 7,866,311 B2 | * | 1/2011 | Warner | A47J 37/079 126/25 B |
| 8,720,349 B1 | * | 5/2014 | David | A47J 37/04 108/151 |
| 8,783,241 B1 | * | 7/2014 | Sauter | F24C 1/16 126/25 A |
| 2004/0061419 A1 | * | 4/2004 | Gallea | A47B 49/006 312/238 |
| 2004/0154603 A1 | * | 8/2004 | Crawford | A47J 37/0731 126/25 R |
| 2006/0042522 A1 | * | 3/2006 | Trubiano | A47B 57/10 108/110 |
| 2007/0089729 A1 | * | 4/2007 | Moses, Jr. | A47J 33/00 126/30 |
| 2007/0242450 A1 | * | 10/2007 | Blatecky | A45B 3/04 362/102 |
| 2009/0014041 A1 | * | 1/2009 | Li | A45B 3/00 135/16 |
| 2009/0283729 A1 | * | 11/2009 | Carlson | B25B 25/00 254/218 |
| 2012/0064215 A1 | * | 3/2012 | Michaud | A47J 37/0704 426/523 |
| 2012/0070556 A1 | * | 3/2012 | Wilson | A47J 33/00 426/523 |

OTHER PUBLICATIONS

The Outdoor Shopper; "CampMaid—Dutch Oven Accessory"; Nov. 12, 2013; https://www.youtube.com/watch?v=fkRx1voC7_k (Year: 2013).*

* cited by examiner

APPARATUS, SYSTEM, AND METHOD FOR COOKING A MEAL

CROSS-REFERENCES TO RELATED APPLICATIONS

This application claims the benefit of U.S. Provisional Patent Application No. 62/083,848 entitled "Apparatus, System, and Method for Cooking a Meal" and filed on Nov. 24, 2014 for Ken Yocum, which is incorporated herein by reference.

FIELD OF THE INVENTION

This invention relates to dutch oven cooking and more particularly relates to an apparatus and method for grilling and frying food items with dutch oven components.

BACKGROUND

A dutch oven is a thick-walled (usually cast iron, aluminum, ceramic and/or clay) cooking pot with a tight-fitting lid. A camping, cowboy, or chuck wagon dutch oven typically has three legs, a wire bail handle, and a slightly concave, rimmed lid so that coals from the cooking fire can be placed on top as well as below. This provides more uniform internal heat and lets the inside act as an oven. These ovens are typically made of bare cast iron, although some are aluminum. Dutch ovens are well suited for long, slow cooking, such as in making roasts, stews, and casseroles. Virtually any recipe that can be cooked in a conventional oven can be cooked in a dutch oven.

While a dutch oven is well suited for baking food items, a dutch oven does not provide a means or method for grilling or frying food items. Unfortunately this limitation often necessitates packing additional stoves or grills to grill or fry food.

For example, if one wishes to grill an item, the user may be required to bring a charcoal grill. Charcoal grills typically include a bowl or other container for holding charcoal. A grill element is placed over the bowl and food items are placed on the grill to receive heat from the charcoal. The charcoal is burnt and consumed as the cooking continues. To continue cooking, fresh charcoal must be added into the bowl. Such refilling can only be done after lifting the grill from the bowl. Obviously, this is an inconvenient method for refilling the bowl.

If a user wishes to fry food items, a third stove and associated frying surface must be carried. Carrying a separate dutch oven, grill and stove can be very difficult in certain camping situations. The present subject matter solves these and other limitations of dutch ovens, grills and stoves.

SUMMARY

From the foregoing discussion, it should be apparent that a need exists for an apparatus, system, and method that allows components of a dutch oven to be used in frying or grilling. Beneficially, such an apparatus, system, and method would be packable within and useable with conventional dutch oven components.

The present invention has been developed in response to the present state of the art, and in particular, in response to the problems and needs in the art that have not yet been fully solved by currently available dutch oven cooking designs. Accordingly, the present invention has been developed to provide an apparatus, system, and method for cooking a meal that overcomes many or all of the above-discussed shortcomings in the art.

In one embodiment, the present subject matter discloses system for cooking a meal which includes an apparatus to adjustably position a fuel source. The apparatus includes a first fuel source receiving space, a second fuel source receiving space and a biasing member. The first fuel source receiving space is defined by a substantially planar first fuel supporting surface and a first wall. The first wall extends substantially perpendicularly from the first fuel supporting surface and circumscribes the first fuel supporting surface. The second fuel source receiving space is hingedly coupled to the first fuel source receiving space. The second fuel source receiving space is defined by a substantially planar second fuel supporting surface and a second wall. The second wall extends substantially perpendicularly from the second fuel supporting surface and circumscribes the second fuel supporting surface. The biasing member is configured to bias at least a portion of the first wall against at least a portion of the second wall.

In certain embodiments, the apparatus includes a recess disposed in either the portion of the first wall or the portion of the second wall that are biased against one another. In an exemplary embodiment, both the portion of the first wall and the portion of the second wall that are biased against one another include a recess. The recess is configured to engage a vertically oriented shaft to limit longitudinal movement of the first wall and the second wall along the shaft.

In another embodiment, the apparatus includes a cooking element engageable with the shaft. In such an embodiment, the recess is configured to adjustably engage the vertically oriented shaft to adjust a distance between the cooking element and the first and second fuel source receiving spaces. The shaft, in an exemplary embodiment, includes a connector configured to releasably engage the cooking element. In certain embodiments, the cooking element comprises either a dutch oven lid or a grill.

The recess, in certain embodiments, includes at least one engaging element disposed within the recess. In such an embodiment, the shaft includes a series of arresting elements disposed at discrete intervals along a length of the shaft. The engaging elements in the recess are engageable with one or more of the arresting elements on the shaft to position the first and second fuel source receiving spaces at a first distance from the cooking element. To reposition the first and second fuel source receiving spaces to a second distance from the cooking element, the engaging elements in the recess are engageable with other, alternative arresting elements on the shaft. In this manner, the distance between the first and second fuel source receiving spaces and the cooking element can be adjusted to alter the cooking temperature received at the cooking element.

The apparatus, in another embodiment, includes at least one handle. The handle is coupled to at least one of the first wall and the second wall. The handle is configured to pivot the first fuel source receiving space away from the second fuel source receiving space. This allows the first fuel source receiving space and the second fuel source receiving space to be removed from the apparatus to refill the first fuel source receiving space and the second fuel source receiving space with charcoal without touching the cooking element or any food contained thereon.

In another embodiment, the handle comprises a first handle coupled to the first wall and a second handle coupled to the second wall. In such an embodiment, the first handle is retractably coupled to the first wall and the second handle is retractably coupled to the second wall. This allows the handles to be repositioned between a nested position and an extended position. In the nested position, at least a portion of the first handle is positioned adjacent the first wall and at least a portion of the second handle is positioned adjacent the second wall. In the extended position, at least a portion of the first handle extends from the first wall and at least a portion of the second handle extends from the second wall. In the nested position the apparatus is sized to fit within a conventional dutch oven. In the extended position, the handles can be used to pivot the first fuel source receiving space away from the second fuel source receiving space.

In yet another embodiment, the first handle is hingedly coupled to the first wall and is pivotable to nest with at least a portion of the first wall. Similarly, the second handle is hingedly coupled to the second wall and is pivotable to nest with at least a portion of the second wall. This also allows the handles to be repositioned between a nested position and an extended position. In the nested position the apparatus is sized to fit within a conventional dutch oven. In the extended position, the handles can be used to pivot the first fuel source receiving space away from the second fuel source receiving space.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided for a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
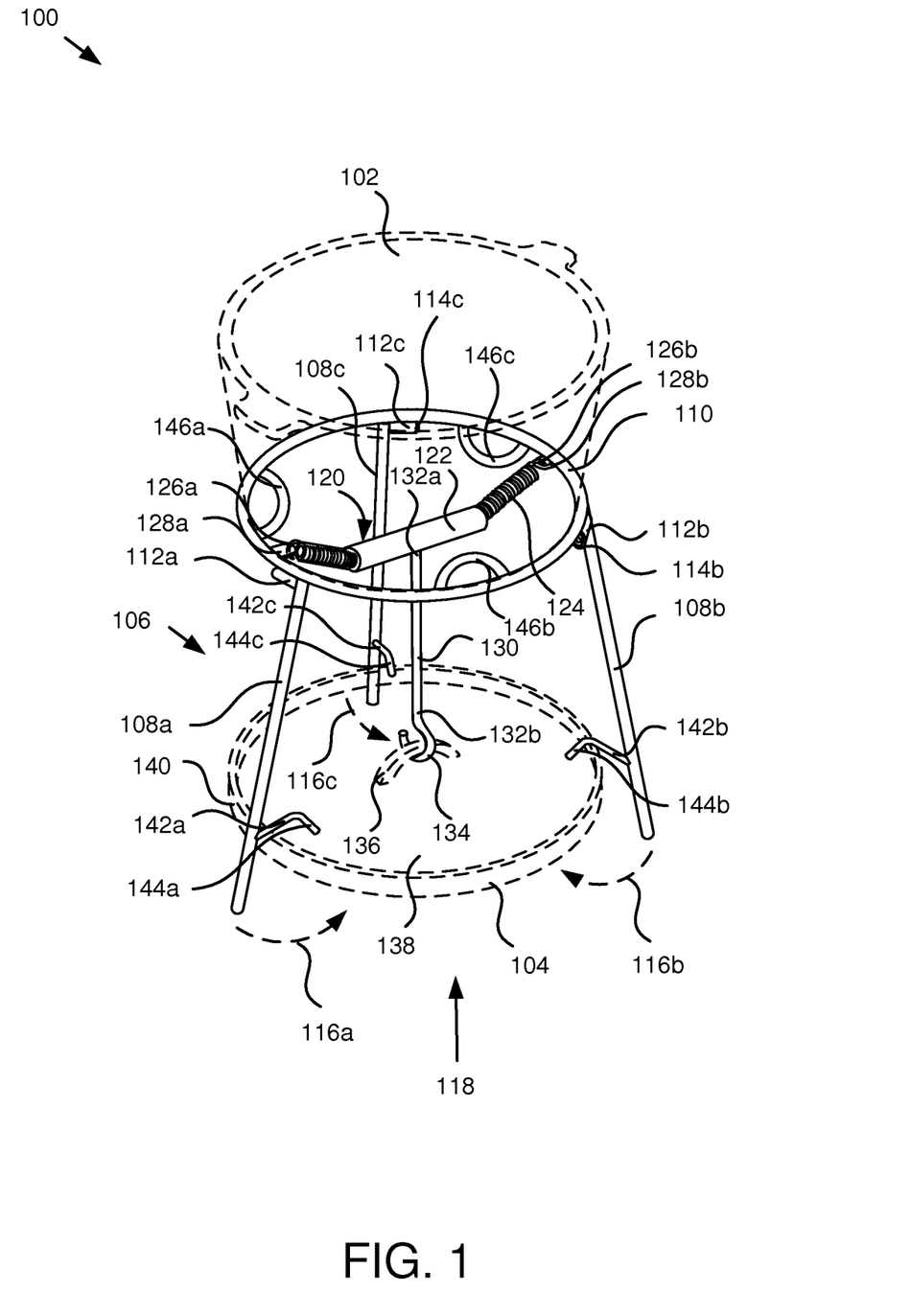
FIG. 1 a perspective view illustrating one embodiment of a pot lid holder according to the present subject matter.

FIG. 1 a perspective view illustrating one embodiment of a pot lid holder 100 according to the present subject matter. In the embodiment illustrated in FIG. 1, a pot 102 and a lid 104 are shown in phantom lines. In certain embodiments, the pot 102 and the lid 104 may be a conventional pot and a conventional lid such as a pot and lid found in a typical kitchen. In other embodiments, the pot 102 and the lid 104 may be a dutch oven pot and a dutch oven lid.

A dutch oven is a thick-walled (usually cast iron, aluminum, ceramic and/or clay) cooking pot with a tight-fitting lid. A camping, cowboy, or chuck wagon dutch oven typically has three legs, a wire bail handle, and a slightly concave, rimmed lid so that coals from the cooking fire can be placed on top as well as below. This provides more uniform internal heat and lets the inside act as an oven. These ovens are typically made of bare cast iron, although some are aluminum. Dutch ovens are well suited for long, slow cooking, such as in making roasts, stews, and casseroles. Virtually any recipe that can be cooked in a conventional oven can be cooked in a dutch oven.

When cooking over a campfire, it is possible to use old-style lipped cast iron dutch ovens as true baking ovens, to prepare biscuits, cakes, breads, pizzas, and even pies. A smaller baking pan can be placed inside the ovens, used and replaced with another as the first batch is completed. It is also possible to stack dutch ovens on top of each other, conserving the heat that would normally rise from the hot coals on the top.

The pot lid holder 100, in certain embodiments, includes a support stand assembly 106 formed of three upright oriented support legs members 108a, 108b, and 108c (collectively support leg members 108). In certain embodiments, the support leg members 108 are made of a substantially rigid material such as aluminum, steel, and the like. The support leg members 108 define a lid 104 receiving space 118 sized to accommodate a lid 104.

In certain embodiments, the top ends of the support leg members 108 are pivotably coupled to a pot support ring 110 by leg coupling members 112a, 112b, and 112c respectively (collectively leg coupling members 112). The leg coupling members 112, in one embodiment, comprise a tubular element welded or otherwise affixed to the pot support ring 110.

Fasteners, i.e., screws 114b and 114c (collectively screws 114) extend through the tubular leg coupling members 112 and are coupled to support legs 108. While the present disclosure contemplates screws 114 as the fasteners to couple the support legs 108 to the pot support ring 110, one of skill in the art will recognize other fasteners may be used.

In the embodiment illustrated in FIG. 1, only the tubular leg coupling members 112b and 112c are shown as having screws 114b and 114c extending through them as tubular leg coupling member 112a obscures the view of a screw that extends therethrough. However, one of skill in the art will recognize that in one embodiment a screw 114 also extends through tubular leg coupling member 112a. The screws 114 are pivotable within the tubular leg coupling members 112 to allow the support legs 108 to pivot inwardly in the directions indicated by arrows 116a, 116b, and 116c. When the support legs 108 are pivoted inwardly in the directions, the pot lid holder 100 becomes more compact for ease of transport.

In certain embodiments, the support legs 108 are sized such that when they are folded inwardly in the directions indicated by arrows 116a, 116b, and 116c, the legs fit within a conventional dutch oven. That is, in one embodiment, the support legs 108 are sized slightly smaller than the diameter of a conventional dutch oven. Of course, one of skill in the art will recognize that dutch ovens come in a variety of sizes and therefore, the support legs 108 may have different sizes depending on the size of the dutch oven for which the pot lid holder 100 will be used.

In one embodiment, the pot lid holder 100 also includes a lid support assembly 120. In certain embodiments, the lid support assembly 120 is detacheably secured within the perimeter of the pot support ring 110. The lid support assembly 120 includes an elongated tubular sleeve 122. As illustrated in FIG. 1, the tubular sleeve 122 is positioned substantially horizontal when the pot lid holder 100 is positioned on a support surface such the ground. A biasing element 124 is positioned through the tubular sleeve 122. In certain embodiments, the biasing element 124 is a spring having hook-shaped tips 126a and 126b at each end of the biasing element 124. The hook-shaped tip 126a is detacheably secured in an aperture in bracket 128a and the hook-shaped tip 126b is detacheably secured in an aperture in bracket 128b such that the biasing element 124 is coupleable to opposing sides of the pot support ring 110.

A vertically oriented shaft 130 has a top end 132a and a bottom end 132b. In certain embodiments, the top end 132a of the shaft 130 is coupled to the tubular sleeve 122 at approximately the center of the tubular sleeve 122. The bottom end 132b of the shaft 130 includes a connector 134 for connecting the shaft 130 to the lid 104. In the embodiment illustrated in FIG. 1, the connector 134 is a hook formed in the bottom end 132b of the shaft 130. The hook is removeably engageable with a handle 136 extending upwardly from the top surface 138 of the lid 104. An annular lip 140 extends around the peripheral edge of top surface 138 of the lid. In use, in certain embodiments, this surface would be covered with hot coals to keep the food in the pot 102 warm.

In certain embodiments, each support leg 108 includes an anchor arm 142a, 142b, and 142c (collectively anchor arms 142). The anchor arms 142 extend inwardly from the respective support leg members 108. Each anchor arm 142 has a hook portion 144a, 144b, and 144c respectively that maintains a downward force against the top surface 138 of the lid 104 and keeps the biasing element 124 under proper tension.

As discussed above, a camping, cowboy, or chuck wagon dutch oven typically has three legs (not shown). These legs extend downward from a bottom surface of the pot 102. In certain embodiments the pot lid holder 100 includes at least three leg engaging loops 146a, 146b, and 146c (collectively leg engaging loops 146). The leg engaging loops 146 coupled to the pot support ring 110 and extend inwardly therefrom. The leg engaging loops 146 are sized and positioned to accommodate the three legs on the camping, cowboy, or chuck wagon dutch oven (not shown).

Figure 2:
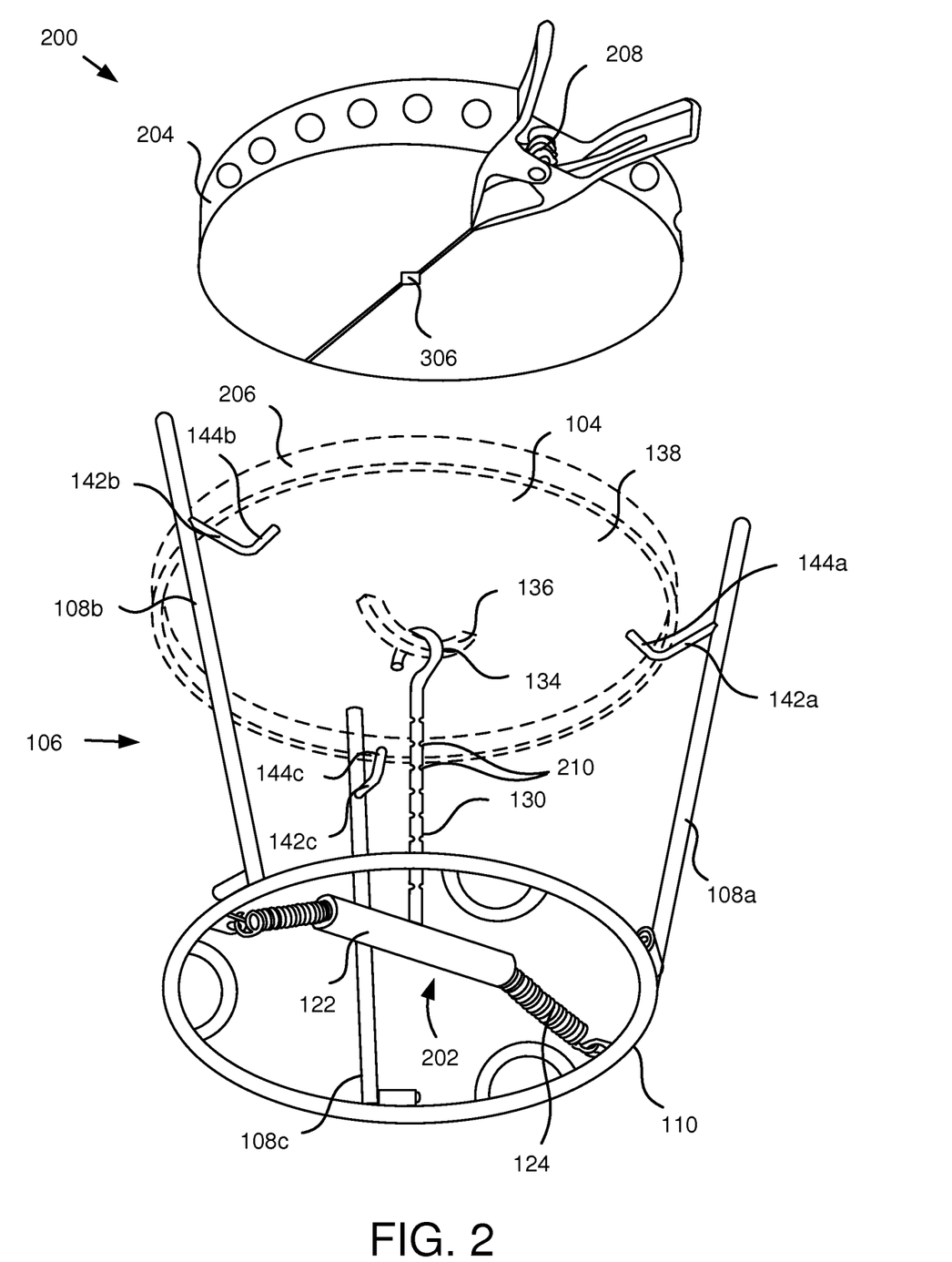
FIG. 2 perspective view illustrating one embodiment of an apparatus for cooking a meal according to the present subject matter.

As discussed above, dutch ovens are well suited for long, slow cooking, such as in making roasts, stews, and casseroles. However, dutch ovens are typically not particularly useful for grilling or frying as they do not typically include a grilling or frying surface. The present disclosure overcomes this particular shortcoming in the dutch oven arts. For example, FIG. 2 is a perspective view illustrating one embodiment of an apparatus for cooking a meal according 200 to the present subject matter.

In certain embodiments, the apparatus for cooking a meal 200 includes a pot support ring 110, a support stand assembly 106, a cooking element coupling assembly 202, and a heating support member 204. As will be evident to one of skill in the art, the pot support ring 110 and the support stand assembly 106 are substantially similar to the pot support ring 110 and the support stand assembly 106 discussed above. Accordingly, repetition of the elements of the pot support ring 110 and the support stand assembly 106 will be forgone herein.

Similarly, the cooking element coupling assembly 202 is substantially similar to the lid support assembly 120 described above. The difference between the cooking element coupling assembly 202 and the lid support assembly 120 is one of terminology. That is, in the embodiment illustrated in FIG. 2 the lid 104 may be used as a cooking element for frying or otherwise grilling a food item. Accordingly, in certain embodiments, the lid 104 may be used as a cooking element 206.

The rest of the cooking element coupling assembly 202 is substantially similar to the lid support assembly 120 described above. Accordingly, the cooking element coupling assembly 120 includes a vertically oriented shaft 130 coupled to a substantially horizontally oriented sleeve portion 122. The sleeve 122 is coupled to the pot support ring 110 by a biasing element 124 that extends through the sleeve 122. The connector 134 connects the shaft 130 to the handle 136 on the lid 104. Each support leg 108a, 108b, and 108c includes an anchor arm 142a, 142b, and 142c. The anchor arms 142 extend inwardly from the respective support leg members 108. Each anchor arm 142 has a hook portion 144a, 144b, and 144c respectively that maintains, in this case, an upward force against the top surface 138 of the lid 104 and keeps the biasing element 124 under proper tension. In this arrangement, the bottom surface (the surface opposing the top surface 138) of the lid 104 may be used as a cooking surface.

Figure 3A:
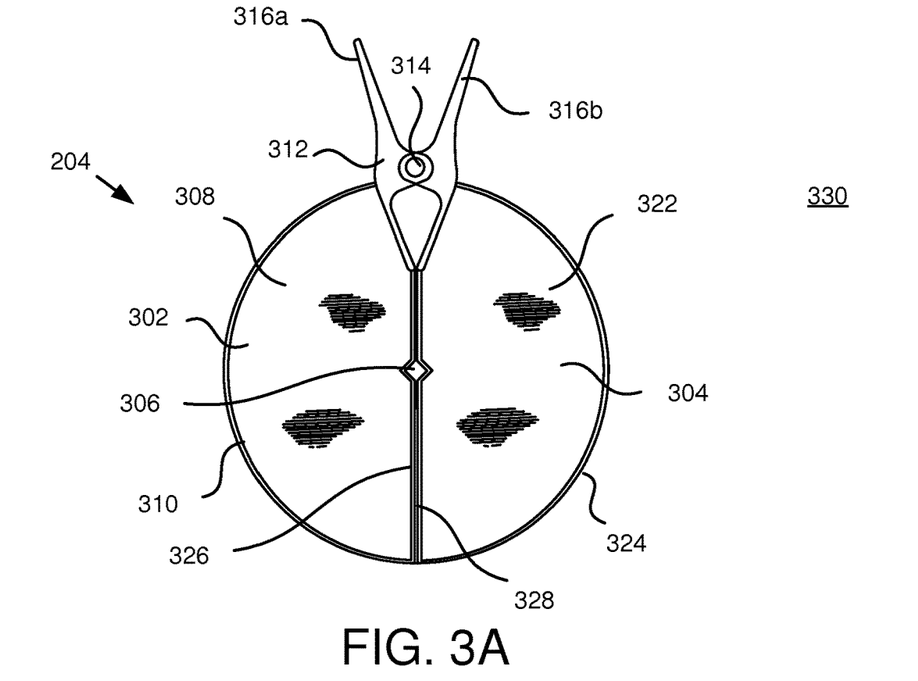
FIG. 3A is a top view further illustrating one embodiment of the heating support member of FIG. 2 according to the present subject matter.
Figure 3B:
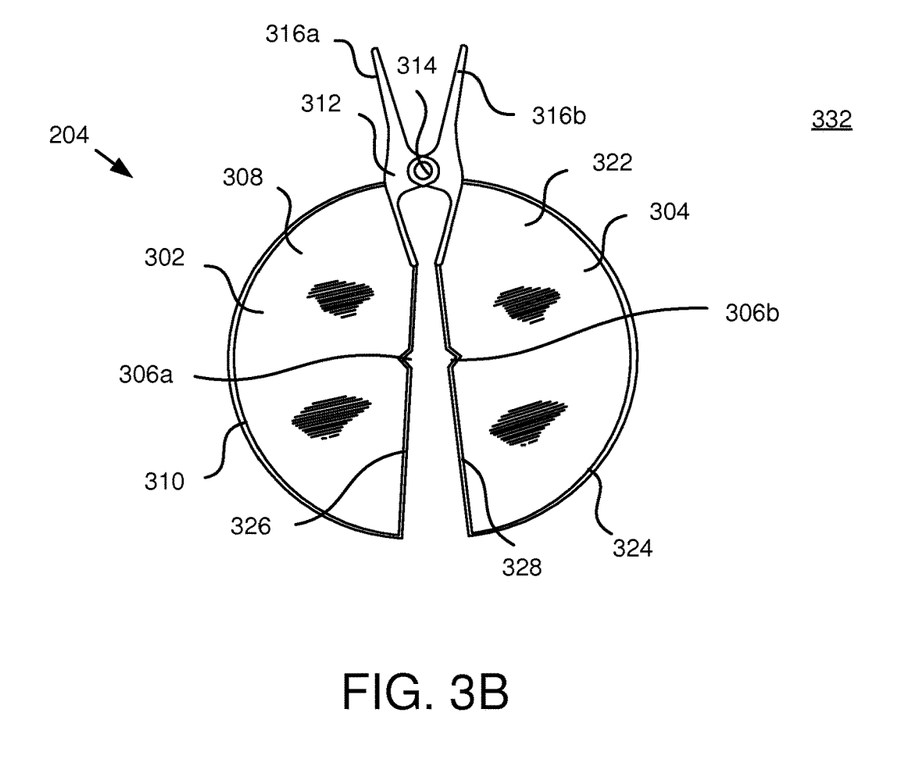
FIG. 3B is a top view further illustrating one embodiment of the heating support member of FIG. 2 according to the present subject matter.

FIG. 3A and FIG. 3B are top views illustrating embodiments of the heating support member 204 of FIG. 2 according to the present subject matter. The heating support member 204 includes, in one embodiment, a first fuel source receiving space 302, a second fuel source receiving space 304, a biasing member 208 (see, FIG. 2), and a recess 306.

The first fuel source receiving space 302 is defined by a substantially planar first fuel supporting surface 308 and a first wall 310. The first wall 310 extends substantially perpendicularly from the first fuel supporting surface 308. The first wall 310 circumscribes the first fuel supporting surface 308.

The second fuel source receiving space 304 is hingedly coupled to the first fuel source receiving space 302. For example, in one embodiment, first fuel source receiving space 302 and the second fuel source receiving space 304 are welded to a conventional spring clamp 312. A pin 314 extends through the spring clamp 312 about which each handle 316a and 316b pivots. Accordingly, by virtue of being welded to the spring clamp 314, the second fuel source receiving space 304 is hingedly coupled to the first fuel source receiving space 302.

The second fuel source receiving space 304 is defined by a substantially planar second fuel supporting surface 322 and a second wall 324. The second wall 324 extends substantially perpendicularly from the second fuel supporting surface 322. The second wall 324 circumscribes the second fuel supporting surface 322.

In certain embodiments, at least a portion 326 of the first wall 310 of the first fuel source receiving space 302 and a portion 328 of the second wall 324 of the second fuel source receiving space 304 are biased against one another when the heating support member 204 is positioned in a closed position 330 as shown in FIG. 3A. In the embodiment illustrated in FIG. 3B, the heating support member 204 is shown in an open position 332. To position the heating support member 204 in the open position 332, a user squeezes handles 316a and 316b. Releasing handles 316a and 316b causes the heating support member 204 to return to the closed position 330.

In certain embodiments, portion 326 of the first wall 310 of the first fuel source receiving space 302 and portion 328 of the second wall 324 of the second fuel source receiving space 304 are substantially planar such that the portions 326 and 328 are positioned parallel one another when the when the heating support member 204 is positioned in the closed position 330. In such an embodiment, the portion 326 of the first wall 310 of the first fuel source receiving space 302 and the portion 328 of the second wall 324 of the second fuel source receiving space 304 include recess 306a and 306b (collectively recess 306). When the heating support member 204 is positioned in the closed position 330, recesses 306a and 306b align with one another to form the overall recess 306.

The biasing member 208 biases portion 326 of the first wall 310 of the first fuel source receiving space 302 against portion 328 of the second wall 324 of the second fuel source receiving space 304 in the closed position 330. In this position, the recess 306 is configured to engage the vertically oriented shaft 130 to limit longitudinal movement of the first fuel source receiving space 302 and the second fuel source receiving space 304 along the vertically oriented shaft 130.

Figure 4:
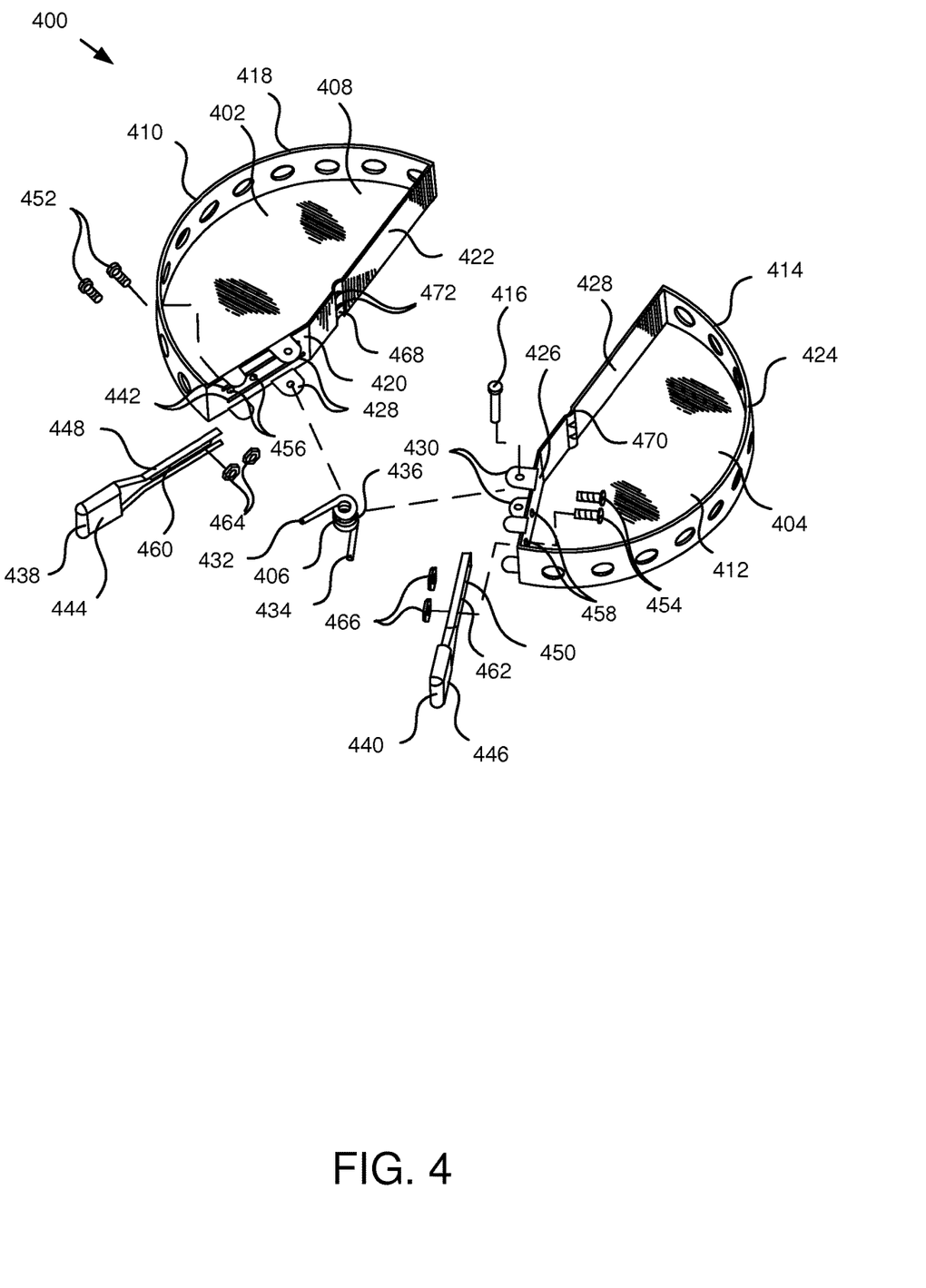
FIG. 4 is an exploded view of a heating support member according to one embodiment of the present subject matter.

FIG. 4 is an exploded view of a heating support member 400 according to one embodiment of the present invention. The heating support member 400 includes a first fuel source receiving space 402, a second fuel source receiving space 404, and a biasing member 406.

In an exemplary embodiment, the first fuel source receiving space 402 is defined by a substantially planar first fuel supporting surface 408 and a first wall 410. The first wall 410 extends substantially perpendicularly from the first fuel supporting surface 408 and circumscribes the first fuel supporting surface 408. The second fuel source receiving space 404 is defined by a substantially planar second fuel supporting surface 412 and a second wall 414. The second wall 414 extends substantially perpendicularly from the second fuel supporting surface 412 and circumscribes the second fuel supporting surface 412.

In certain embodiments, the first wall 410 includes an arched portion 418 and two planar portions 420 and 422. Similarly, the second wall 414 includes an arched portion 424 and two planar portions 426 and 428. The arched portions 418 and 424 includes a series of apertures 404. The apertures 404 allow air to flow into the first fuel source receiving space 402 and second fuel source receiving space 404 to assist with combustion.

The arched portion 418 of the first wall 410 includes an end connected to an end of the planar portion 422 of the first wall 410 and an opposing end connected to the planar portion 420 of the first wall 410. Planar portion 422 of the first wall 410 is connected to planar portion 420 of the first wall 410 such that the first wall circumscribes the first fuel supporting surface 408. An angle of less than 180° exists between portion 422 of the first wall 410 and planar portion 420 of the first wall. The second wall 414 and the substantially planar second fuel supporting surface 412 is a mirror image of the first wall 410 and the first fuel supporting surface 408. Accordingly, arched portion 424 of the second wall 414 includes an end connected to an end of the planar portion 428 of the second wall 414 and an opposing end connected to the planar portion 426 of the second wall 414. Planar portion 428 is connected to planar portion 426 of the second wall 414 such that the second wall 414 circumscribes the second fuel supporting surface 412. An angle of less than 180° exists between planar portion 428 of the second wall 414 and planar portion 426 of the second wall 414.

Planar portion 420 of the first wall 410 includes a pair of lugs 428 that extend substantially perpendicularly from the top and bottom of the planar portion 420 of the first wall 410. Planar portion 426 of the second wall 414 also includes a pair of lugs 430 that extend substantially perpendicularly from the top and bottom of the planar portion 426 of the second wall 414. Each of the lugs 428 and 430 includes an aperture through which a fastener 416 is positioned to pivotably connect the planar portion 420 of the first wall 410 to planar portion 426 of the second wall 414.

The biasing member 406, in certain embodiments, is positioned between planar portion 420 of the first wall 410 and planar portion 426 of the second wall 414. The biasing member 406, in one embodiment, is a torque spring which includes two rectilinear portions 432 and 434 extending from a helical portion 436. The helical portion 436 of the biasing member 406 is positioned between the lugs 428 on the planar portion 420 of the first wall 410 and between lugs 430 on the planar portion 426 of the second wall 414 such that the center of the helical portion 436 of the biasing member 406 align with the apertures in the lugs 428 and 430. The fastener 416 extends through the apertures in the lugs 428 and 430 and through the helical portion 436 of the biasing member 406 to both pivotably couple the planar portion 420 of the first wall 410 to planar portion 426 of the second wall 414 and to fasten the biasing member 406 to the lugs 428 and 430. Each rectilinear portion 432 and 434 is positioned adjacent either the planar portion 420 of the first wall 410 or the planar portion 426 of the second wall 414 to bias the planar portion 422 of the first wall 410 against the planar portion 428 of the second wall 414.

The fastener 416 is preferably a rivet. The fastener 416 can be a pin, a threaded bolt or any other proper element in another embodiment. Thus, the first fuel source receiving space 402 and the second fuel source receiving space 404 are pivotally connected to each other.

In use, with the heating support member 400 fully assembled, planar portion 422 of the first wall 410 is biased against the planar portion 428 of the second wall 414 by virtue of the biasing member 406. Handles 438 and 440 are operable to pivotably force the planar portion 420 of the first wall 410 towards the planar portion 426 of the second wall 414. When the planar portion 420 of the first wall 410 pivots towards the planar portion 426 of the second wall 414, the planar portion 422 of the first wall 410 pivots away from the planar portion 428 of the second wall 414. At this point, the biasing member 406 is loaded. Releasing the handles 438 and 440 causes the support member assembly 400 to return to a position wherein the planar portion 422 of the first wall 410 is positioned adjacent the planar portion 428 of the second wall 414.

The planar portion 422 of the first wall 410 includes a recess 468. In certain embodiments, the planar portion 428 of the second wall 414 also includes a recess 470. When the planar portion 422 of the first wall 410 is biased against the planar portion 428 of the second wall 414, the recess 468 in the planar portion 422 of the first wall 410 is disposed opposite the recess 470 in the planar portion 428 of the second wall 414. In this position, the recesses 468 and 470 are configured to engage a vertically oriented shaft 130 to limit longitudinal movement of the first wall 410 and the second wall 414 along the shaft 130.

In certain embodiments, the recesses 468 and 470 include at least one engaging element 472 disposed within the recesses 468 and 470. For example, in one embodiment, the recesses 468 and 470 may include one or more raised ridges extending across the concave interior surface of the recesses 468 and 370. In such an embodiment, the vertically oriented shaft 130 includes a series of arresting elements 210 (see, FIG. 2) disposed at discrete intervals along a length of the shaft 130. The engaging elements 472 are engageable with one or more of the arresting elements 210 in the series of arresting elements to position the first source receiving space 402 and second fuel source receiving space 404 at a first distance from the cooking element 206. To alter the distance between the cooking element 206 and the first source receiving space 402 and second fuel source receiving space 404 the engaging elements 472 are engaged with arresting elements 210 either closer to or further away from the cooking element 206 to position the first and second fuel source receiving spaces 402 and 404 at a second distance from the cooking element 206.

The planar portion 420 of the first wall 410 includes two ribs 442 extending from the surface of the planar portion 420 of the first wall 410 opposite the first fuel source receiving space 402. The ribs 442 define a groove through which at least a portion of the handle 438 slides. Although not shown in FIG. 4, planar portion 426 of the second wall 414, being a mirror image of planar portion 420 of the first wall 410, also includes two ribs extending from the surface of the planar portion 426 of the second wall 414 opposite the second fuel source receiving space 404. The ribs define a groove through which at least a portion of the handle 440 slides.

Each of the handles 438 and 440 includes a grip 444 and 446 and a shank 448 and 450 respectively. The shanks 448 and 450 of each of the handles 438 and 440 is inserted into the corresponding grooves defined by the ribs 442 (or not shown) on the planar portion 420 of the first wall 410 and the planar portion 426 of the second wall 414. The shanks 448 and 450 of each of the handles 438 and 440 is secured to the corresponding planar portion 420 of the first wall 410 or the planar portion 426 of the second wall 414 by inserting two threaded bolts 452 or 454 through apertures 456 or 458 in the corresponding planar portion 420 of the first wall 410 or the planar portion 426 of the second wall 414. The threaded bolts 452 or 454 extend through a slot 460 or 462 in the corresponding handle 438 or 440. Each of the threaded bolts 452 or 454 is engaged with a corresponding nut 464 or 466.

Figure 5A:
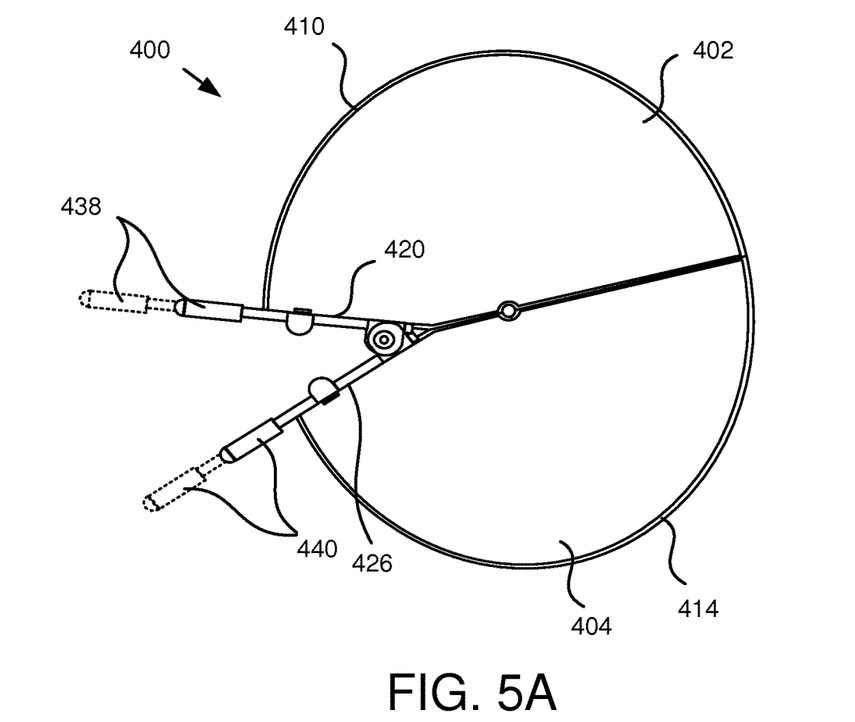
FIG. 5A is a top view of the heating support member of FIG. 4 according to one embodiment of the present invention.

FIG. 5A is a top view of the heating support member 400 of FIG. 4 according to one embodiment of the present invention. In the embodiment illustrated in FIG. 5A, the first handle 438 is retractably coupled to the planar portion 420 of the first wall 410 and the second handle 440 is retractably coupled to the planar portion 426 of the second wall and 440. The handles are repositionable between a nested position, as illustrated in a solid line, and an extended position, as depicted in a phantom line. In the nested position the overall profile of the heating support member 400 is minimized allowing the heating support member 400 to be stored in a conventional dutch oven. In the extended position, the handles 438 and 440 can be manipulated to pivot the first fuel source receiving space 402 away from the second fuel source receiving space 404. This allows a user to easily remove the heating support member 400 from the vertically oriented shaft 130 without having to remove the cooking element 204.

Figure 5B:
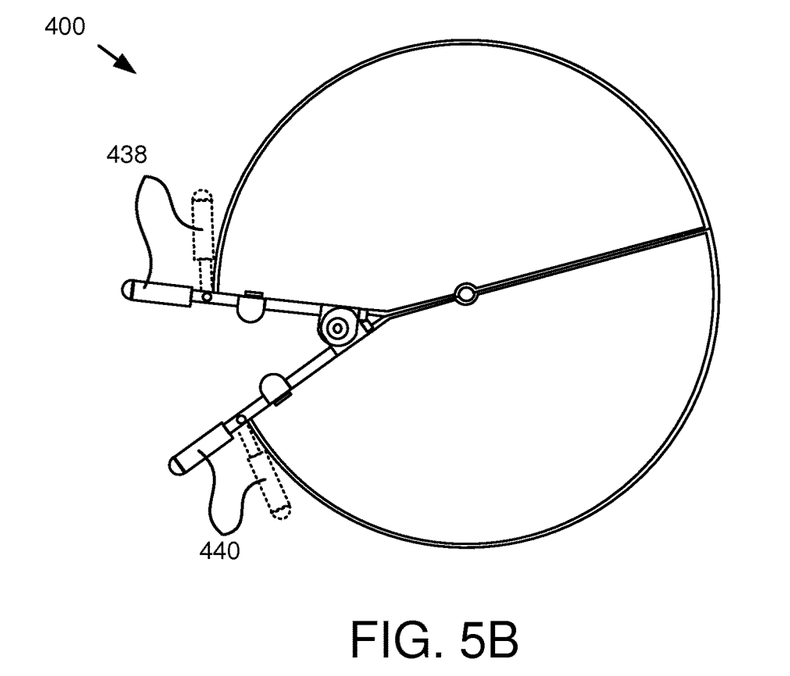
FIG. 5B is a top view of an alternative arrangement for the handles of the heating support member of FIG. 4 according to one embodiment of the present invention.

FIG. 5B is a top view of an alternative arrangement for the handles 438 and 440 of the heating support member 400 of FIG. 4 according to one embodiment of the present invention. In the embodiment illustrated in FIG. 5B, the first handle 438 is hingedly coupled to the planar portion 420 of the first wall 410 and the second handle 440 is hingedly coupled to the planar portion 426 of the second wall and 440. The handles are repositionable between a an extended position, as illustrated in a solid line, and an nested position, as depicted in a phantom line. In the nested position the first handle 438 is pivoted to nest with at least a portion of the first wall 410 and the second handle 440 is pivoted to nest with at least a portion of the second wall 414. In the nested position, the overall profile of the heating support member 400 is minimized allowing the heating support member 400 to be stored in a conventional dutch oven. In the extended position, the handles 438 and 440 can be manipulated to pivot the first fuel source receiving space 402 away from the second fuel source receiving space 404. This allows a user to easily remove the heating support member 400 from the vertically oriented shaft 130 without having to remove the cooking element 206.

Figure 6:
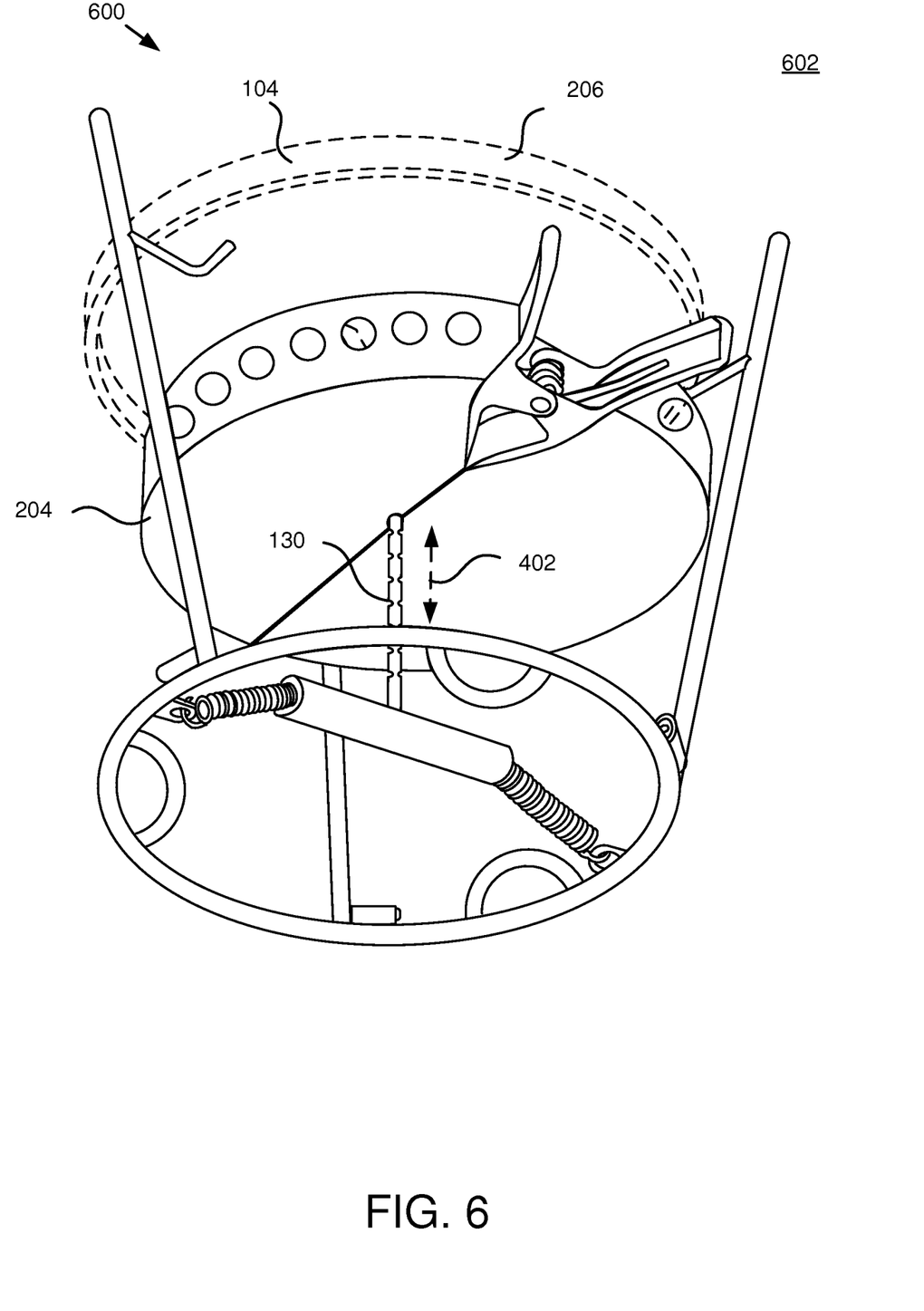
FIG. 6 is a perspective view illustrating one embodiment of an apparatus for cooking a meal depicting a heating support member positioned in a cooking position according to the present subject matter.

FIG. 6 is a perspective view illustrating one embodiment of an apparatus for cooking a meal 600 depicting a heating support member 204 positioned in a cooking position 602 according to the present subject matter. While the apparatus for cooking a meal 600 is depicted with heating support member 204, one of skill in the art will recognize heating support member 400 may be utilized with the apparatus for cooking a meal 600.

With the heating support member 204 positioned in the cooking position 602, the amount of heat applied to the cooking element 206 (in this case the lid 104) can be varied by varying the position of the heating support member 204 longitudinally along the vertically oriented shaft 130 in the direction of arrow 402.

Because the heating support member 204 is to be used as a heat source, one of skill in the art will recognize that heating support member 204 should be made of a material able to withstand heat. For example, in certain embodiments, the heating support member 204 may be configured to contain charcoal briquettes. Therefore, the heating support member 204 should be able to withstand the heat produced by charcoal briquettes. In other embodiments, other fuel sources may be used.

Figure 7:
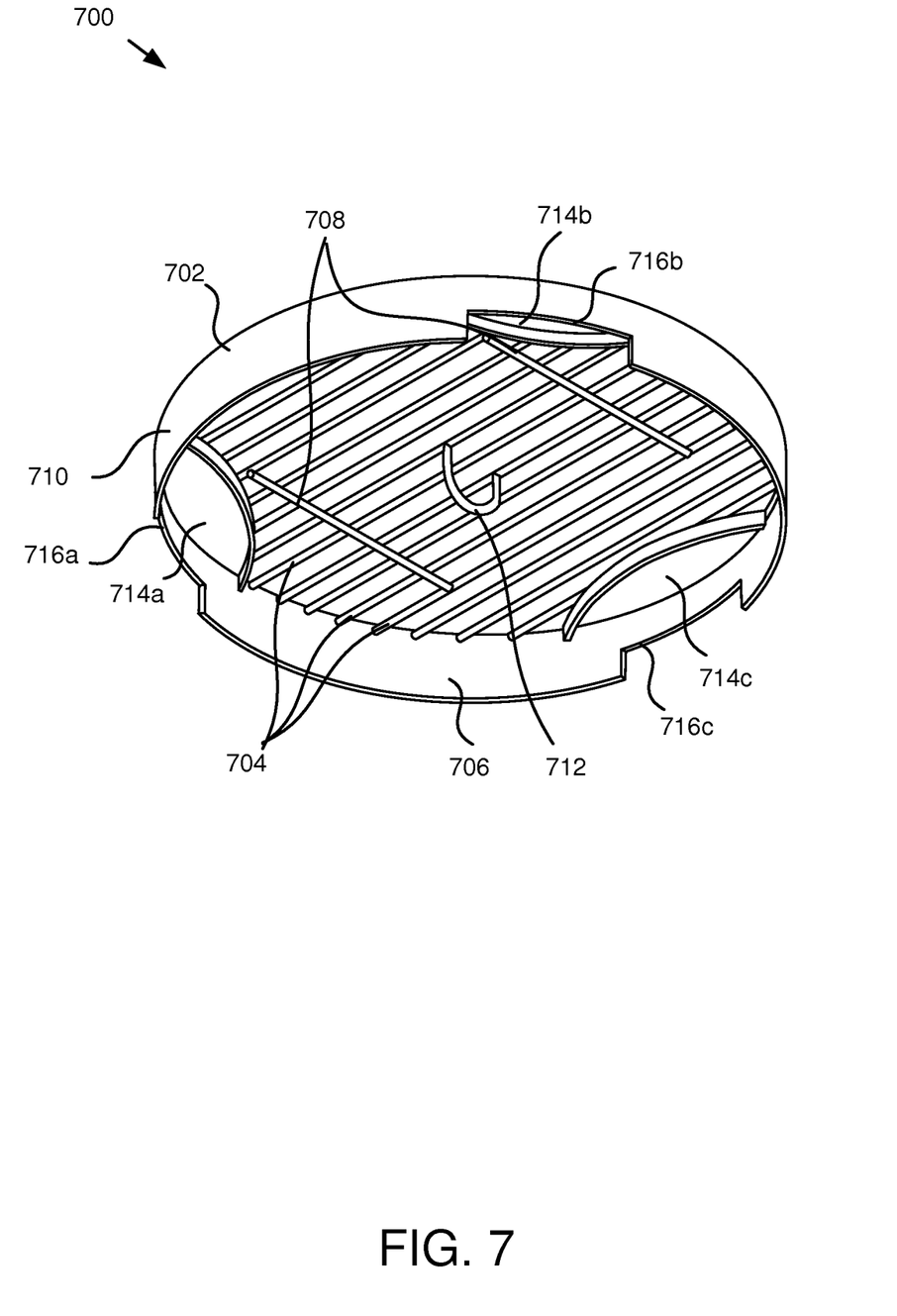
FIG. 7 is a perspective view illustrating one embodiment of a cooking element according to the present subject matter.

While the apparatus for cooking a meal 200 depicts the cooking element 206 as a lid 104 to a dutch oven, one of skill in the art will recognize alternative cooking elements 206 may be used. For example, FIG. 7 is a perspective view illustrating one embodiment of a cooking element 700 according to the present subject matter.

In certain embodiments, the cooking element 700 includes an annular wall 702 disposed about the periphery of the cooking element 700. A series of substantially rigid rods 704 extend across the cooking element 700 and are coupled to the inner surface 706 of the annular wall 702 to form a grill 710. The rods 704 may be welded or otherwise affixed to the inner surface 706 of the annular wall 702. One or more supporting rods 708 extend across the rods 704 to provide additional support to the grill 710.

A hooking loop 712 is coupled to two or more of the rods 704 at approximately a center of the grill 710. Alternatively, the hooking loop 712 may be coupled to a single rod 704 at two positions. The hooking loop 712 is engageable with the connector 134 on the shaft 130 to engage the grill with the shaft 130. Support plates 714a, 714b, and 714c engage hook portions 144a, 144b, and 144c of the apparatus for cooking a meal 200 to maintain an upward force against the support plates 714a, 714b, and 714c of the grill 710 to keep the biasing element 124 under proper tension. In this manner, apparatus for cooking a meal 200 may be used to grill food items in addition to frying food items with the lid 104 of the dutch oven.

In certain embodiments, the annular wall 702 includes recesses 716a, 716b and 716c positioned adjacent the 714a, 714b, and 714c. The recesses 716a, 716b and 716c allow the hook portions 144a, 144b, and 144c of the apparatus for cooking a meal 200 to engage the support plates 714a, 714b, and 714c of the cooking element 700 without interference from the annular wall 702. This allows the heating support member 204 to be positioned closer to the cooking element 700 for instances where a more direct heat is required to cook a food item.

Figure 8:
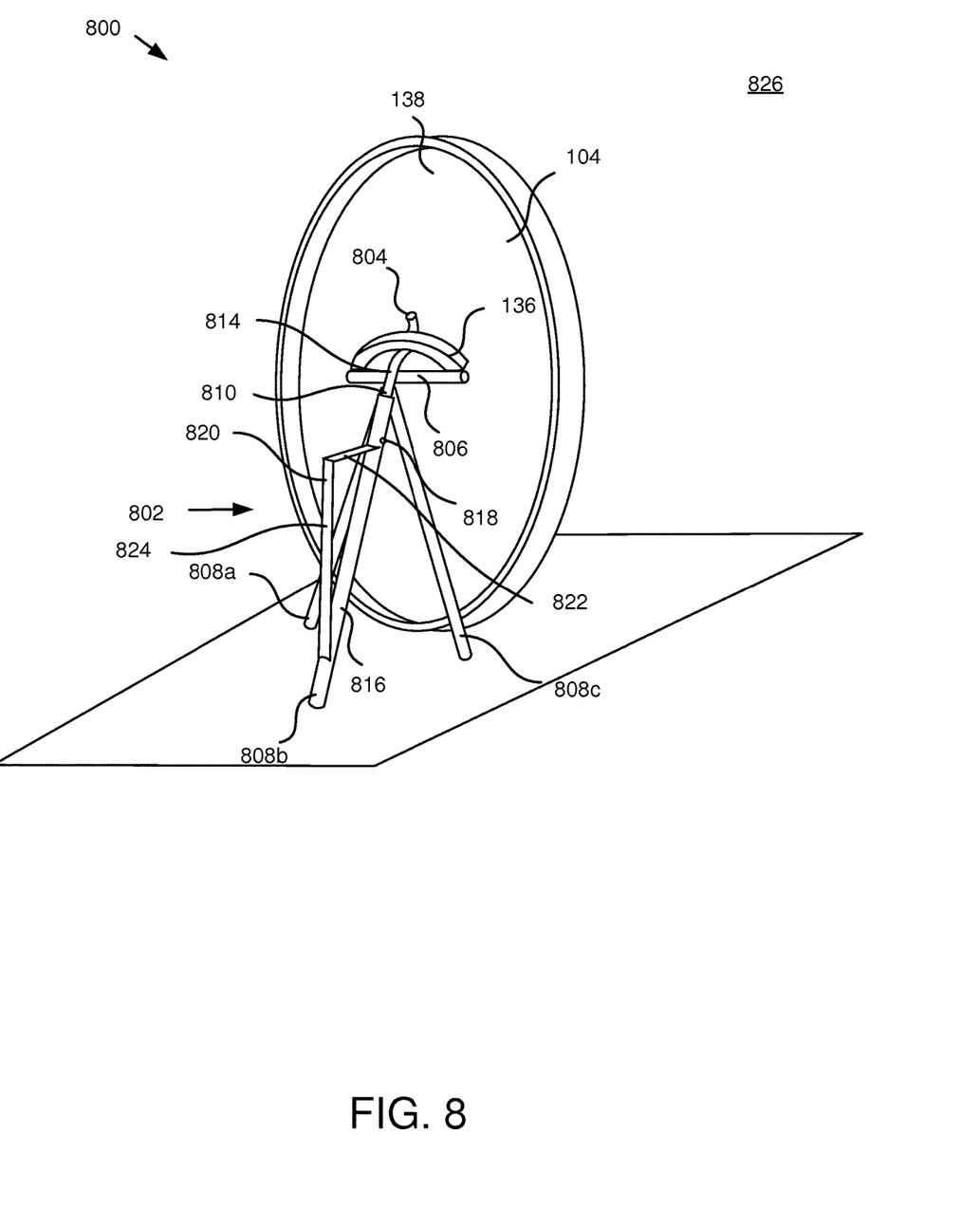
FIG. 8 is a perspective view illustrating one embodiment of a lid holder according to the present subject matter.

FIG. 8 is a perspective view illustrating one embodiment of a lid holder 800 according to the present subject matter. In certain embodiments, the lid holder 800 includes a support stand assembly 802, a connector 804, and a pivot arrest 806.

The support stand assembly 802, in certain embodiments, includes at least three support leg members 808a, 808b, and 808c (collectively support leg members 808). The three support leg members 808 extend from a common point 810 to form a tripod. In certain embodiments, the first leg 808a and the third leg 808c are welded or otherwise permanently affixed to one another. The second leg 808b is removeably coupleable to the first leg 808a and the third leg 808c such that the support stand assembly 802 may be broken down for transport. For example, in one embodiment, the first leg 808a and the third leg 808c are coupled to a first tubular member 814. In such an embodiment, the second leg 808b is a tubular member 816 sized to receive the first tubular member 814.

Figure 9:
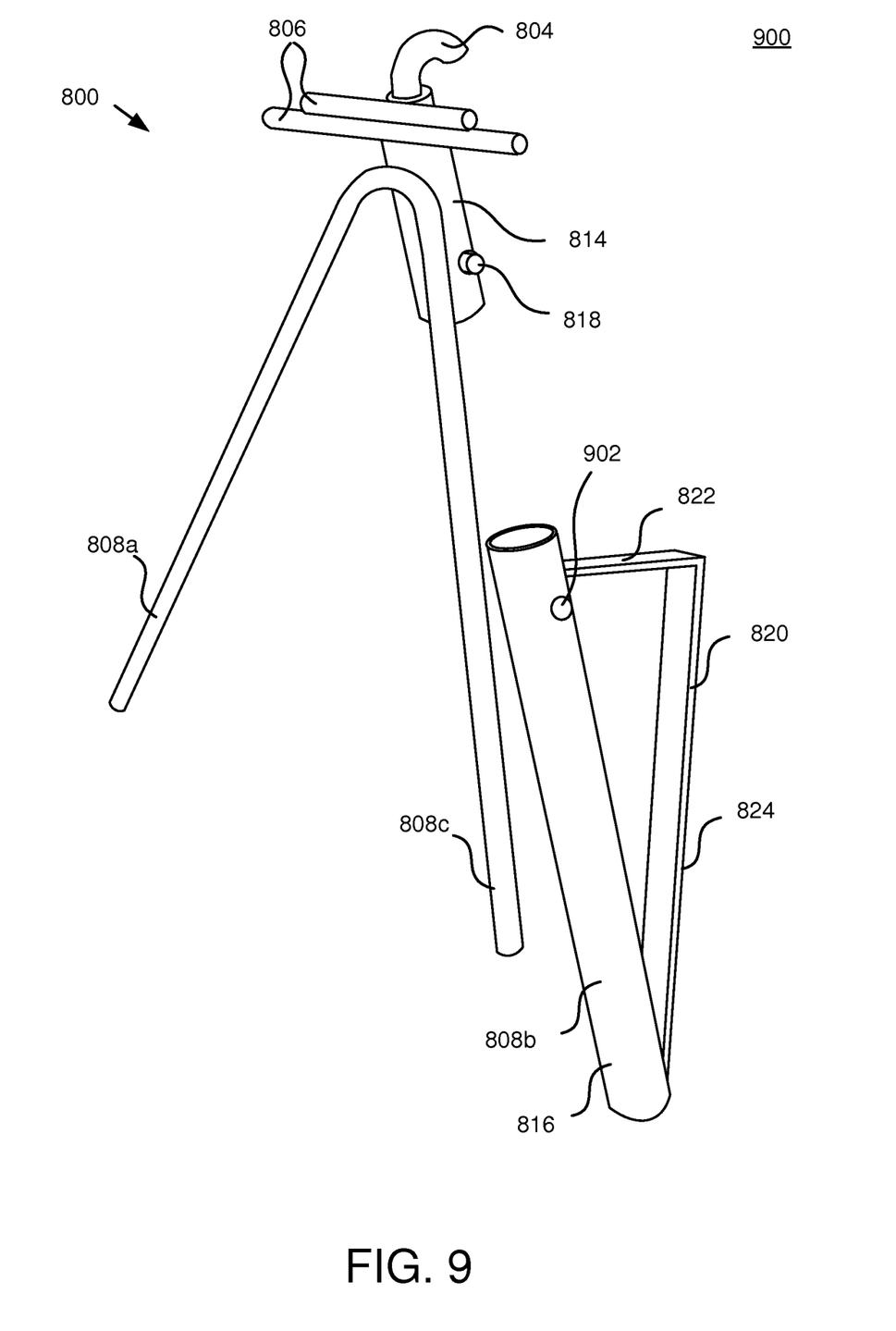
FIG. 9 is an exploded view of the lid holder of FIG. 8 according to one embodiment of the present subject matter.

In other embodiments, the support legs 808 may pivot relative to one another. In such an embodiment, the support legs 808 may be positioned adjacent and parallel to one another in a transport position 900 (See, FIG. 9). In a support position 826 as illustrated in FIG. 8, the support legs 808 form a tripod for supporting the lid 104. In the transport position 900, as shown in FIG. 9, the support legs 808 are uncoupled from one another for ease of transport.

An orifice in the tubular member 816 receives a push pin 818 to couple the second leg 808b to the first leg 808a and the third leg 808c. Depressing the push pin 818 allows the tubular member 816 to be slid off of the first tubular member 814 to uncouple the first leg 808a and the third leg 808c from the second leg 808b. In this manner, the first leg 808a and the third leg 808c may be uncoupled from the second leg 808b for ease of transport of the lid holder 800.

The connector 804 is a hook formed at the top of the first tubular member 814 opposite the end of the first tubular member 814 that is received within the second tubular member 816 forming the second leg 808b. The connector 804 is removeably engageable with a handle 136 extending upwardly from the top surface 138 of the lid 104. The pivot arrest 806 is welded to and extends substantially perpendicularly from the first tubular member 814. The pivot arrest 806 keeps the lid 104 from pivoting about the first tubular member 814 by engaging the top surface 138 of the lid 104 on either side of the first tubular member 814.

In certain embodiments, the lid holder 800 includes a handgrip 820. At least a portion 822 of the handgrip 820 extends from the second leg 808b. A connecting portion 824 of the handgrip 820 is coupled to the second leg 808b to form a triangle between the second leg 808b and the handgrip 820.

In use, the hook of the connector 804 engages handgrip 135 of the lid 104 to remove the lid 104 from the pot 102. The support stand assembly 802 may then be positioned such that each of the support legs 808 forming the tripod are positioned on a support surface such as the ground. The support legs 808 support the lid 104 in the support position 826 as illustrated in FIG. 8.

FIG. 9 is an exploded view of the lid holder 800 of FIG. 8 according to one embodiment of the present subject matter. In the embodiment illustrated in FIG. 9, the first leg 808a and the third leg 808c comprise a single elongated shaft which is bent to extend in two downwardly directions. The single elongated shaft of the first leg 808a, the third leg 808c, the connector 804, and the pivot arrests 806 are coupled to the first tubular member 814 by welding or similar coupling method. In the embodiment illustrated in FIG. 9, the pivot arrests 806 include two bars that extend across the first tubular member 814 at a right angle. The connector 804 extends from a top of the first tubular member 814.

The second tubular member 816 makes up the second leg 808b. The second tubular member 816 is sized and shaped to receive the first tubular member 814 to form a tripod with the first leg 808a, the second leg 808b and the third leg 808c.

Orifice 902 in the second tubular member 816 receives a push pin 818 on the first tubular member 814 to removably couple the second leg 808b to the first leg 808a and the third leg 808c.

A portion 822 of the handgrip 820 is welded to and extends from the second leg 808b. A connecting portion 824 of the handgrip 820 is coupled to the second leg 808b to form a triangle between the second leg 808b and the handgrip 820.

In the transport position 900, the first tubular member 814 is decoupled from the second tubular member 818 such that the second tubular member 818 may be positioned adjacent one of the first leg 808a or the second leg 808c to reduce the overall size of the lid holder 800. In this position, the size of the lid holder 800 is small enough to fit in a conventional dutch oven.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a support stand assembly formed of three upright support leg members, wherein the three upright support leg members are pivotably coupled to a support ring and each of the three upright support leg members comprise a hook portion;
   a first fuel source receiving space, the first fuel source receiving space defined by a substantially planar first fuel supporting surface and a first wall, the first wall extending substantially perpendicularly from the first fuel supporting surface, wherein the first wall circumscribes the first fuel supporting surface;
   a second fuel source receiving space hingedly coupled to the first fuel source receiving space, the second fuel source receiving space defined by a substantially planar second fuel supporting surface and a second wall, the second wall extending substantially perpendicularly from the second fuel supporting surface, wherein the second wall circumscribes the second fuel supporting surface;
   a biasing member configured to bias at least a portion of the first wall against at least a portion of the second wall; and
   a vertically oriented shaft centered within the support stand assembly and attached to the support ring by a biasing element, the vertically oriented shaft having a top end and a bottom end, wherein the bottom end engages with a hooking loop of a grill cooking element and the top end attaches to a tubular sleeve, wherein the biasing element passes through the tubular sleeve connecting to opposite sides of the support ring, wherein the grill cooking element comprises three support plates that engage the hook portion of each of the three upright support leg members using tension of the biasing element applied against the hooking loop of the grill cooking element; wherein the grill cooking element comprises an annular wall circumscribing a grill portion of the grill cooking element; and wherein the annular wall includes three recesses positioned adjacent the three support plates allowing the hook portion of each of the three upright support leg members to contact the three support plates without interference from the annular wall.

2. The apparatus of claim 1, further comprising a recess disposed in at least one of the portion of the first wall and the portion of the second wall that are biased against one another, wherein the recess is configured to engage the vertically oriented shaft to limit longitudinal movement of the first wall and the second wall along the shaft.

3. The apparatus of claim 2, wherein the recess is configured to adjustably engage the vertically oriented shaft to adjust a distance between the grill cooking element and the first and second fuel source receiving spaces.

4. The apparatus of claim 2, further comprising at least one engaging element disposed within the recess, wherein the shaft comprises a series of arresting elements disposed at discrete intervals along a length of the shaft, wherein the at least one engaging element is engageable with at least one of the arresting elements in the series of arresting elements to position the first and second fuel source receiving spaces at a first distance from the grill cooking element.

5. The apparatus of claim 4, wherein the at least one engaging element is engageable with another arresting element in the series of arresting elements to position the first and second fuel source receiving spaces at a second distance from the grill cooking element.

6. The apparatus of claim 1, further comprising at least one handle, the at least one handle coupled to at least one of the first wall and the second wall, the at least one handle configured to pivot the first fuel source receiving space away from the second fuel source receiving space.

7. The apparatus of claim 6, wherein the at least one handle comprises a first handle and a second handle, the first handle coupled to the first wall, the second handle coupled to the second wall.

8. The apparatus of claim 7, wherein the first handle is retractably coupled to the first wall and wherein the second handle is retractably coupled to the second wall, wherein, in a nested position, at least a portion of the first handle is positioned adjacent the first wall and at least a portion of the second handle is positioned adjacent the second wall and wherein, in an extended position, at least a portion of the first handle extends from the first wall and at least a portion of the second handle extends from the second wall.

9. The apparatus of claim 7, wherein the first handle is hingedly coupled to the first wall and wherein the first handle is pivotable to nest with at least a portion of the first wall, wherein the second handle is hingedly coupled to the second wall and wherein the second handle is pivotable to nest with at least a portion of the second wall.

10. An adjustable heating apparatus comprising:
    a support stand assembly formed of three upright support leg members, wherein the three upright support leg members are pivotably coupled to a support ring and each of the three upright support leg members comprise a hook portion;
    a first fuel source receiving space, the first fuel source receiving space defined by a substantially planar first fuel supporting surface and a first wall, the first wall extending substantially perpendicularly from the first fuel supporting surface, wherein the first wall circumscribes the first fuel supporting surface;
    a second fuel source receiving space hingedly coupled to the first fuel source receiving space, the second fuel source receiving space defined by a substantially planar second fuel supporting surface and a second wall, the second wall extending substantially perpendicularly from the second fuel supporting surface, wherein the second wall circumscribes the second fuel supporting surface;

a biasing member configured to bias at least a portion of the first wall against at least a portion of the second wall;

a recess disposed in at least one of the portion of the first wall and the portion of the second wall that are biased against one another, wherein the recess is configured to engage a vertically oriented shaft to limit longitudinal movement of the first wall and the second wall along the shaft; and the vertically oriented shaft centered within the support stand assembly and attached to the support ring by a biasing element, the vertically oriented shaft having a top end and a bottom end, wherein the bottom end engages with a hooking loop of a grill cooking element and the top end attaches to a tubular sleeve, wherein the biasing element passes through the tubular sleeve connecting to opposite sides of the support ring, and wherein the grill cooking element comprises three support plates that engage the hook portion of each of the three upright support leg members using tension of the biasing element applied against the hooking loop of the grill cooking element; wherein the grill cooking element comprises an annular wall circumscribing a grill portion of the grill cooking element; and wherein the annular wall includes three recesses positioned adjacent the three support plates allowing the hook portion of each of the three upright support leg members to contact the three support plates without interference from the annular wall.

11. The adjustable heating support of claim 10, wherein the recess is configured to adjustably engage the vertically oriented shaft to adjust a distance between the grill cooking element and the first and second fuel source receiving spaces.

12. The adjustable heating support of claim 11, further comprising at least one engaging element disposed within the recess, wherein the shaft comprises a series of arresting elements disposed at discrete intervals along a length of the shaft, wherein the at least one engaging element is engageable with a first arresting element in the series of arresting elements to position the first and second fuel source receiving spaces at a first distance from the grill cooking element.

13. The adjustable heating support of claim 12, wherein the at least one engaging element is engageable with a second arresting element in the series of arresting elements to position the first and second fuel source receiving spaces at a second distance from the grill cooking element.

14. The adjustable heating support of claim 10, further comprising at least one handle, the at least one handle coupled to at least one of the first wall and the second wall, the at least one handle configured to pivot the first fuel source receiving space away from the second fuel source receiving space.

15. An apparatus for cooking a meal, the apparatus comprising:
a support stand assembly formed of three upright support leg members, wherein the three upright support leg members are pivotably coupled to a support ring and each of the three upright support leg members comprise a hook portion;
a vertically oriented shaft engageable with a grill cooking element;

a first fuel source receiving space, the first fuel source receiving space defined by a substantially planar first fuel supporting surface and a first wall, the first wall extending substantially perpendicularly from the first fuel supporting surface, wherein the first wall circumscribes the first fuel supporting surface;

a second fuel source receiving space hingedly coupled to the first fuel source receiving space, the second fuel source receiving space defined by a substantially planar second fuel supporting surface and a second wall, the second wall extending substantially perpendicularly from the second fuel supporting surface, wherein the second wall circumscribes the second fuel supporting surface; a biasing member configured to bias at least a portion of the first wall against at least a portion of the second wall;

a recess disposed in at least one of the portion of the first wall and the portion of the second wall that are biased against one another, wherein the recess is configured to engage the vertically oriented shaft to limit longitudinal movement of the first wall and the second wall along the shaft to adjust a distance between the grill cooking element and the first and second fuel source receiving spaces; and the vertically oriented shaft centered within the support stand assembly and attached to the support ring by a biasing element, the vertically oriented shaft having a top end and a bottom end, wherein the bottom end engages with a hooking loop of the grill cooking element and the top end attaches to a tubular sleeve, and wherein the biasing element passes through the tubular sleeve connecting to opposite sides of the support ring, wherein the grill cooking element comprises three support plates that engage the hook portion of each of the three upright support leg members using tension of the biasing element applied against the hooking loop of the grill cooking element; wherein the grill cooking element comprises an annular wall circumscribing a grill portion of the grill cooking element; and wherein the annular wall includes three recesses positioned adjacent the three support plates allowing the hook portion of each of the three upright support leg members to contact the three support plates without interference from the annular wall.

16. The apparatus for cooking a meal of claim 15, further comprising at least one engaging element disposed within the recess, wherein the shaft comprises a series of arresting elements disposed at discrete intervals along a length of the shaft, wherein the at least one engaging element is engageable with a first arresting element in the series of arresting elements to position the first and second fuel source receiving spaces at a first distance from the grill cooking element.

17. The apparatus for cooking a meal of claim 16, wherein the at least one engaging element is engageable with a second arresting element in the series of arresting elements to position the first and second fuel source receiving spaces at a second distance from the grill cooking element.

18. The apparatus for cooking a meal of claim 15, further comprising at least one handle, the at least one handle coupled to at least one of the first wall and the second wall, the at least one handle configured to pivot the first fuel source receiving space away from the second fuel source receiving space.

* * * * *